June 21, 1932.  P. S. ECKLAND ET AL  1,863,972
DUAL TRANSMISSION SHIFTING DEVICE
Filed Sept. 26, 1930    2 Sheets-Sheet 1
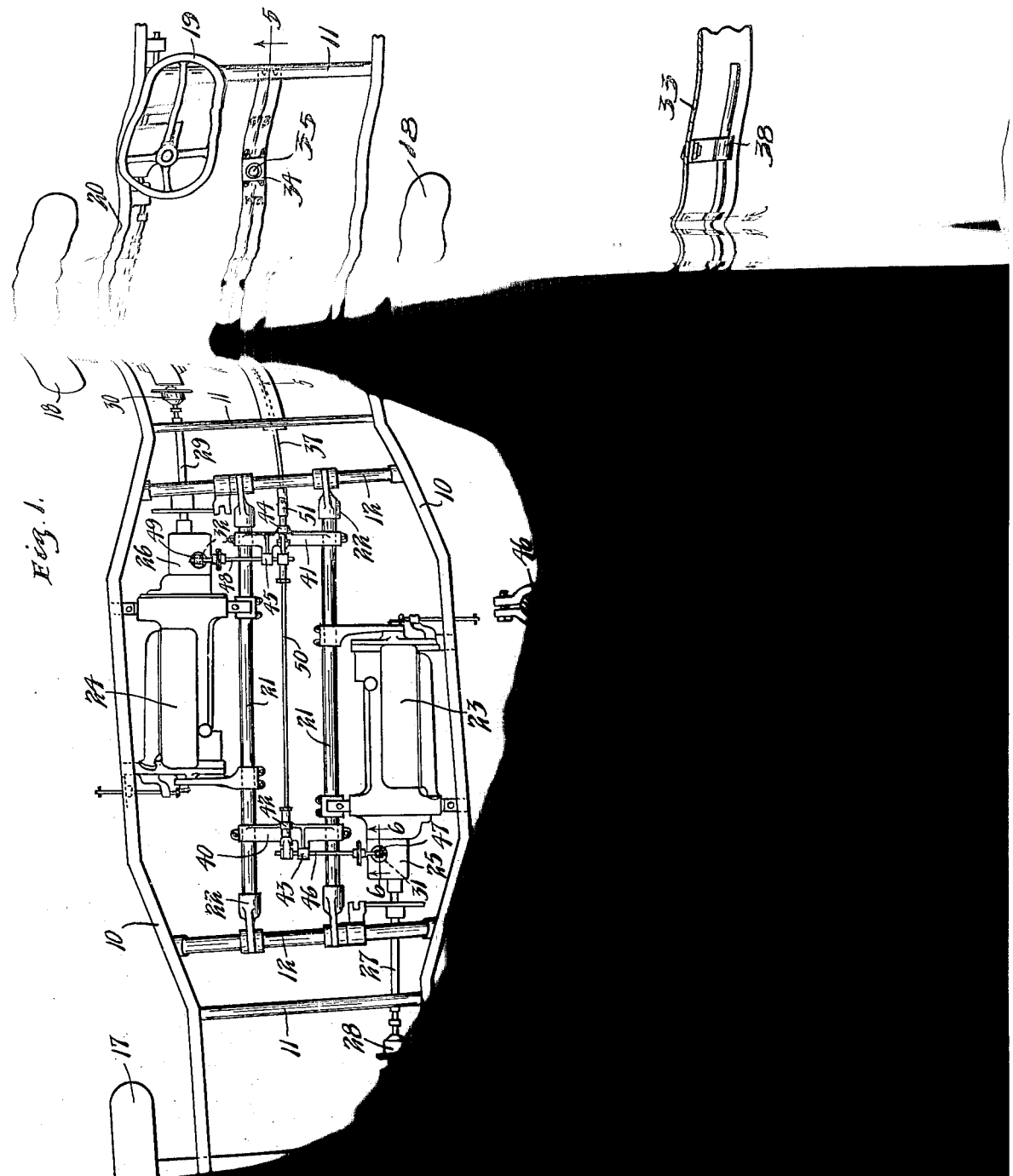

Patented June 21, 1932

1,863,972

UNITED STATES PATENT OFFICE

PETER S. ECKLAND AND GUNNAR RYDEN, OF MINNEAPOLIS, MINNESOTA, ASSIGNORS TO ECKLAND BROS. COMPANY, OF MINNEAPOLIS, MINNESOTA, A CORPORATION OF MINNESOTA

DUAL TRANSMISSION SHIFTING DEVICE

Application filed September 26, 1930. Serial No. 484,530.

This invention relates to devices for simultaneously shifting variable speed transmissions of a pair of engines in a wheeled vehicle.

It is the main object of the present invention to provide in a wheeled vehicle the combination of a first engine adapted to drive the rear wheels of the vehicle, a second engine adapted to drive the front wheels of the vehicle, variable speed transmissions from the two engines to the rear and front wheels respectively, and novel means for simultaneously shifting the two transmissions to cause the front and rear wheels to be rotated in the same direction and at the same gear ratio relative to the two engines, when the engines are running.

It is a further object of the invention to provide novel improvements in the shifting means disclosed in our joint United States application for patent entitled "Transmission shifting devices for vehicles having two engines", filed December 23, 1929, Serial Number 416,102.

To these ends, the invention consists in the novel parts and novel combinations of parts, hereinafter defined in the claims and described in the following specification, made in connection with the accompanying drawings, wherein like reference characters refer to the same or similar parts throughout the various views, and, in which.

Fig. 1 is a plan view of the main portions of a chassis of a wheeled vehicle equipped with two engines, one engine being adapted to drive the rear wheels and one engine being adapted to drive the front wheels, with an embodiment of the present invention applied thereto;

Fig. 2 is a plan on an enlarged scale illustrating certain portions of the shifting mechanism in applied relation;

Fig. 3 is a vertical section taken on the line 3—3 of Fig. 2, as indicated by the arrows; certain of the parts being illustrated in full lines in one position and in dotted lines in another position;

Fig. 4 is a view in rear elevation looking towards the front of the vehicle and illustrating certain of the parts shown in Fig. 3;

Fig. 5 is a vertical section taken on the line 5—5 of Fig. 1, as indicated by the arrows; and Fig. 6 is a view taken chiefly in vertical section on the line 6—6 of Fig. 1.

Referring to the drawings, portions of the chassis of a four wheeled drive motor bus are illustrated, which include the two side frames 10 generally disposed parallel to each other, but bulged outwardly from each other at their central portions, cross bars 11 connecting the forward and rear portions of the side frames 10, two cross bars 12 connecting the outwardly bulged portions of the side frames 10, rear axle 13, front axle 14, rear differential 15, front differential 16, rear wheels 17, front wheels 18 adapted to be both steered and driven, steering wheel 19 and steering mechanism 20 for steering the front wheels 18 of the vehicle. The two cross bars 12 are connected together by a pair of bars 21 fitting at their ends in sockets 22 secured to the cross bars 12, the said bars 21 being disposed in parallel relation and extending generally longitudinally of the chassis but being disposed at their forward ends in closer spaced relation to the right side frame 10 than to the left side frame and being disposed at their rear ends in more closely spaced relation to the left side frame 10 than to the right side frame 10. Accordingly, the two bars 21, although disposed in the same horizontal plane, are inclined slightly relative to the longitudinal central axis of the vehicle. Suitably supported from the right bar 21 and right side frame 10 is a gasoline engine 23 for driving the rear wheels of the vehicle. The engine 23 is disposed to face in the same general direction relative to the vehicle that an ordinary rear wheel drive automobile engine faces and the engine 23, accordingly, can be considered to face forwardly. A second gasoline engine 24 is suitably supported from the left bar 21 and the left side frame 10 and this engine is adapted to drive the front wheels of the vehicle. The engine 24 faces in a direction generally opposite to the normal direction that an engine for a rear wheel drive automobile engine usually faces and, accordingly, the engine 24 can be conend of the shaft 48 and this arm projects downwardly from the shaft 48 and terminates in a cylindrical portion which fits within the notch 50d. A forwardly projecting pin 54 is secured to the arm 52 and this pin is received between the two forked portions of a downwardly extending forked arm 55 secured to the shaft 50 adjacent its rear end. A similar forwardly projecting pin 56 is carried by the arm 53 and this pin is received between the two forked portions of an upwardly projecting forked arm 57 carried by the shaft 50 adjacent its forward end.

*Operation*

When it becomes desirable during operation of the vehicle equipped with the present device to shift gears of the variable speed transmissions of the engines 23 and 24, the driver of the vehicle will merely operate the main gear shift lever 35 of the vehicle in the usual manner for shifting gears in a standard automobile, and the gears in the two transmissions for the engines 23 and 24 will be simultaneously operated to cause the rear wheels 17 and front wheels 18 to be driven in the same direction and in the same gear ratio relative to the engines 23 and 24 respectively. Let us consider, for example, that the driver of the vehicle wishes to shift the two transmissions of the engines 23 and 24 from low gear to second gear, and that when the vehicle is being driven in low gear, the gear shift lever 31 is tilted rearwardly and to the left and the gear shift lever 32 is correspondingly tilted forwardly and to the right, while to shift to the second gear, the gear shift lever 31 should be carried forwardly and to the right and gear shift lever 32 should be carried correspondingly rearwardly and to the left. The main and controlling gear shift lever 35 when the levers 31 and 32 are in position to operate the transmissions in low gear, will be disposed rearwardly and to the left and in order to shift the levers 31 and 32 from low to second gears simultaneously the upper end of controlling lever 35 will be moved forwardly and to the right. As the upper end of controlling gear shift lever 35 is moved forwardly and to the right, motion will be imparted from the lever through the socket at the lower end thereof and the arm 36 to the rod 37 to rotate the rod 37 to the left and slide the rod 37 rearwardly. The inclined shaft 50 will, of course, be moved in the same manner that the rod 37 is moved and will rock to the left and slide rearwardly. As this occurs, the forked arm 55 will swing to the right side of the vehicle, while the forked arm 57 will swing toward the left side of the vehicle. The forked arm 55 engaging the pin 54 will cause the shaft 46 to be slid to the right while the forked arm 57 engaging the pin 56 will cause the shaft 48 to be slid to the left. The notched portion 50c of the shaft 50 will engage the cylindrical portion of the arm 52 to cause this arm to swing rearwardly and rock the shaft 46 in a rearward direction, while the notched portion 50d of the shaft 50 will engage the cylindrical portion of the arm 53 to cause this arm to swing rearwardly and thereby rock the shaft 48 forwardly. The two shafts 46 and 48 will thus be slid in opposite directions and rotated in opposite directions as the inclined shaft 50 is slid and rotated. As the shaft 46 slides to the right and rocks rearwardly, the arm 47 will be carried to the right and swung forwardly thereby causing the upper end of the gear shift lever 31 to move to the right and forwardly to shift the transmission 25 from low to second gear. As the shaft 48 slides to the left and rocks forwardly, the arm 49 will be swung rearwardly and moved to the left thereby causing the upper end of gear shift lever 32 to be moved to the left and rearwardly to shift the transmission 26 from low to second gear. It will be seen that no matter how the main control gear shift lever 35 is shifted, the two gear shift levers 31 and 32 will be simultaneously shifted in inverse directions relative to each other so that the rear and front wheels will be driven in the same direction and in the same gear ratios relative to the two engines. No special construction of gear shifts or transmission mechanism for the two engines will be required, it being possible to use standard and similar gear shifts and transmission mechanisms for both engines.

It will, of course, be understood that various changes may be made in the form, details, arrangement and proportions of the various parts without departing from the scope of the present invention.

What is claimed is:—

1. In a vehicle of the class described, a pair of parallel shafts mounted for both sliding and rocking movement and operably connected respectively to the shift levers for the transmissions of a pair of oppositely disposed engines, a third shaft mounted for sliding and rocking movement and extending between said first mentioned shafts and having portions disposed respectively above and below the two first mentioned shafts, downwardly extending connecting means between one of said portions and the first mentioned shaft below the same for transmitting a combined sliding and rocking movement thereto, upwardly extending means between the other portion and the first mentioned shaft above the same for transmitting a combined sliding and rocking movement thereto, and a central operating means for imparting both rocking and sliding movement to said third shaft whereby as said third shaft is slid and rocked, said first mentioned shafts will be rocked and slid in opposite directions relative to each other.

2. In a wheeled vehicle of the class described, a pair of parallel shafts mounted for both sliding and rocking movement and operably connected respectively to the shift levers for the transmissions of a pair of oppositely disposed engines, an inclined shaft extending between said two first mentioned shafts and having a notched portion above one of said shafts and a notched portion below the other of said shafts, arms carried by said two first mentioned shafts and extending respectively upwardly and downwardly to fit within the notched portions of said second mentioned shaft, forked arms carried adjacent the notched portions of said second mentioned shaft and extending respectively downwardly and upwardly therefrom and pins carried by said first mentioned shafts and fitting within said forked arms.

3. In a wheeled vehicle, the combination of two oppositely disposed engines adapted to respectively drive the rear wheels and front wheels of the vehicle, a pair of variable speed transmissions for said two engines, a pair of shifting members for shifting said two transmissions, a pair of spaced parallel shafts mounted for both sliding and rocking movement, connecting means between respective shafts and shifting members for imparting universal pivotal movement to said shifting members as said shafts are respectively slid and rocked, a third shaft mounted for both sliding and rocking movement and having a portion disposed over one of said first mentioned shafts and having a second portion disposed below the other of said first mentioned shafts, a central operating means for imparting both rocking and sliding movement to said third shaft, downwardly extending connecting means between the first mentioned portion of said third shaft and the first mentioned shaft below the same for respectively imparting a combined sliding and rocking movement thereto, upwardly extending connecting means between the third portion of said second mentioned shaft and the first mentioned shaft above the same for imparting a combined rocking and sliding movement thereto, whereby when said central operating means is moved, said two shifting members may be simultaneously operated in inverse directions.

4. The combination in a wheeled vehicle, of a pair of oppositely facing engines adapted respectively to drive the front and rear wheels of the vehicle, a pair of variable speed transmissions respectively for said engines, members for shifting each of said two transmissions, a pair of spaced shafts mounted for both sliding and rocking movement, means for imparting universal pivotal motion to one of said shifting members as one of said shafts is slid and rocked, means for imparting universal pivotal motion to the other of said shifting members as the other of said shafts is slid and rocked, a third shaft mounted for both sliding and rocking movement extending between said first mentioned shafts and having one end disposed above one of said first mentioned shafts and its other end disposed below the other of said first mentioned shafts, said third shaft having transverse sockets cut therein at its ends above and below said two first mentioned shafts respectively, arms carried by said two first mentioned shafts and extending respectively upwardly and downwardly into said sockets, pins carried by said first mentioned shafts, forks carried adjacent the ends of said third shaft and receiving said pins, whereby as said third shaft is rocked and slid, said shifting members will be simultaneously operated in inverse directions.

5. The combination in a wheeled vehicle, of a pair of oppositely facing engines adapted respectively to drive the rear and front wheels of the vehicle, a pair of variable speed transmissions respectively for said engines, shifting levers for shifting said two transmissions and pivoted for universal pivotal movement, a pair of spaced parallel shafts having portions adjacent said shifting levers, ball and socket connecting members between respective shafts and shifting levers, said two shafts being mounted for both sliding and rocking movement, a shaft mounted for both sliding and rocking movement extending between said first mentioned shafts and having transversely notched portions disposed respectively above and below said two first mentioned shafts, forked arms carried by said last mentioned shaft adjacent each of said two portions and projecting downwardly and upwardly respectively towards said two first mentioned shafts, arms carried by said two shafts and respectively projecting upwardly and downwardly therefrom, said arms having portions fitting within said notched portions of said last mentioned shaft, pins carried by said pair of shafts and fitting respectively within said forked arms and centrally controlled means for imparting both sliding and rocking movement to said last mentioned shaft to cause said shifting levers to be simultaneously moved in inverse direction.

In testimony whereof we affix our signatures.

PETER S. ECKLAND.
GUNNAR RYDEN.

June 21, 1932.  W. H. ELLIS, JR  1,863,973
INDENTED PAPER
Filed Dec. 19, 1930
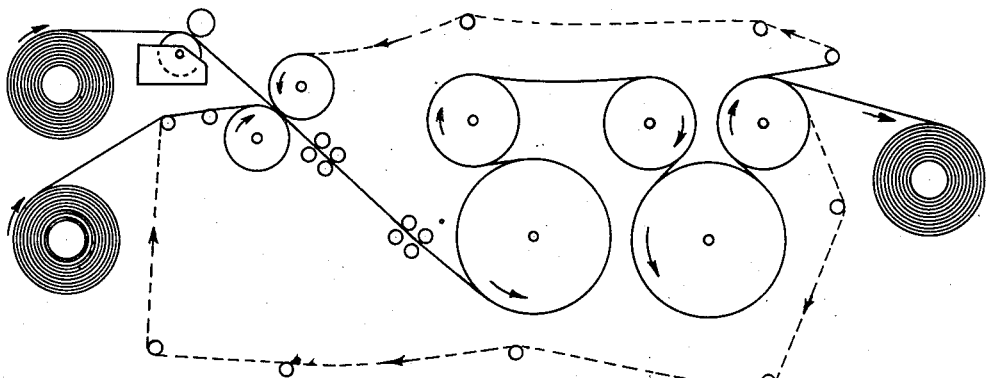
Fig.1.
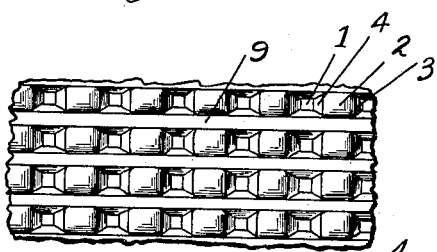
Fig.2.
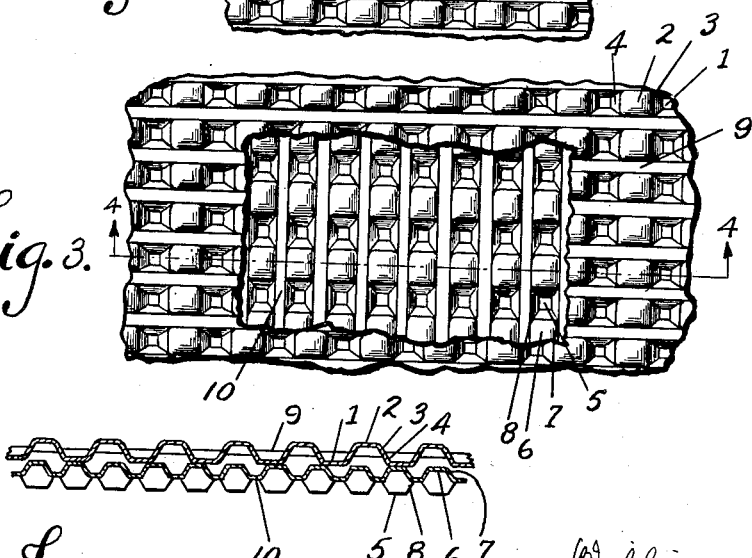
Fig.3.
Fig.4.
INVENTOR.
William H. Ellis Jr.
BY
ATTORNEYS